US011436144B2

(12) United States Patent
Pawlowski et al.

(10) Patent No.: US 11,436,144 B2
(45) Date of Patent: Sep. 6, 2022

(54) CACHE MEMORY ADDRESSING

(71) Applicant: Micron Technology, Inc., Boise, ID (US)

(72) Inventors: Joseph Thomas Pawlowski, Boise, ID (US); Elliott Clifford Cooper-Balis, San Jose, CA (US); David Andrew Roberts, Wellesley, MA (US)

(73) Assignee: Micron Technology, Inc., Boise, ID (US)

( * ) Notice: Subject to any disclaimer, the term of this patent is extended or adjusted under 35 U.S.C. 154(b) by 116 days.

(21) Appl. No.: 16/846,266

(22) Filed: Apr. 10, 2020

(65) Prior Publication Data

US 2021/0318958 A1 Oct. 14, 2021

(51) Int. Cl.
| | |
|---|---|
| *G06F 12/0864* | (2016.01) |
| *G06F 12/084* | (2016.01) |
| *G06F 12/0853* | (2016.01) |
| *G06F 12/02* | (2006.01) |
| *G06F 9/30* | (2018.01) |
| *G06F 13/16* | (2006.01) |

(52) U.S. Cl.
CPC ........ *G06F 12/084* (2013.01); *G06F 9/30047* (2013.01); *G06F 9/30101* (2013.01); *G06F 12/0284* (2013.01); *G06F 12/0853* (2013.01); *G06F 12/0864* (2013.01); *G06F 13/1689* (2013.01); *G06F 2212/1021* (2013.01)

(58) Field of Classification Search
None
See application file for complete search history.

(56) References Cited

U.S. PATENT DOCUMENTS

| | | | | |
|---|---|---|---|---|
| 6,449,694 B1* | 9/2002 | Burgess, Jr | ......... | G06F 12/0864 711/128 |
| 2005/0114600 A1* | 5/2005 | Citron | ................. | G06F 12/0802 711/118 |
| 2007/0192541 A1* | 8/2007 | Balasubramonian | ........................ | G06F 12/0893 711/118 |

(Continued)

OTHER PUBLICATIONS

Lishing Liu. "Partial Address Directory for Cache Access." Jun. 1994. IEEE. IEEE Transactions on Very Large Scale Integration (VLSI) Systems. vol. 2. pp 226-240.*

(Continued)

*Primary Examiner* — Nathan Sadler
(74) *Attorney, Agent, or Firm* — Colby Nipper PLLC

(57) ABSTRACT

Described apparatuses and methods order memory address portions advantageously for cache-memory addressing. An address bus can have a smaller width than a memory address. The multiple bits of the memory address can be separated into most-significant bits (MSB) and least-significant bits (LSB) portions. The LSB portion is provided to a cache first. The cache can process the LSB portion before the MSB portion is received. The cache can use index bits of the LSB portion to index into an array of memory cells and identify multiple corresponding tags. The cache can also check the corresponding tags against lower tag bits of the LSB portion. A partial match may be labeled as a predicted hit, and a partial miss may be labeled as an actual miss, which can initiate a data fetch. With the remaining tag bits from the MSB portion, the cache can confirm or refute the predicted hit.

25 Claims, 10 Drawing Sheets

(56) References Cited

U.S. PATENT DOCUMENTS

2014/0281116 A1* 9/2014 Abdallah ............ G06F 12/1054
711/3
2015/0347308 A1* 12/2015 Venkumahanti .... G06F 12/0855
711/120

OTHER PUBLICATIONS

Michael Slater. "AMD's K5 Designed to Outrun Pentium." Oct. 1994. Microprocessor Report. vol. 8. No. 14.*
Joshi et al. "A 2-Slot Time-Division Multiplexing (TDM) Interconnect Network for Gigascale Integration (GSI)." Feb. 2004. ACM. SLIP'04. pp. 64-68.*
Balasubramonian et al. "Leveraging Wire Properties at the Microarchitecture Level." Nov. 2006. IEEE. IEEE Micro. pp. 40-52.*
Jacob et al. Memory Systems: Cache, DRAM, Disk. 2008. Elsevier. pp. 3, 329, 330.*
Woo et al. "Heterogeneous Die Stacking of SRAM Row Cache and 3-D DRAM: An Empirical Design Evaluation." Aug. 2011. IEEE. MWSCAS 2011.*
Muralimanohar et al. "Interconnect Design Considerations for Large NUCA Caches." Jun. 2007. ACM. ISCA'07. pp. 369-380.*

* cited by examiner

800

Determine, at a processor of a host, that data corresponding to a memory address is being referenced by a program, the memory address including a most significant bit (MSB) portion and a least significant bit (LSB) portion
802

Formulate, at a memory controller of the host, a memory request for the data based on the memory address
804

Transmit a first message for the memory request to a cache memory over an interconnect, the first message including the LSB portion of the memory address
806

After transmission of the first message, transmit a second message for the memory request to the cache memory over the interconnect, the second message including the MSB portion of the memory address
808

```
┌─────────────────────────────────────────┐
│ Receive a least significant bit (LSB)   │
│ portion of a memory address from an     │
│ interconnect as part of a memory        │
│ request, the LSB portion including set  │
│ index bits and first tag bits           │
│                   902                   │
└─────────────────────────────────────────┘
                    │
                    ▼
┌─────────────────────────────────────────┐
│ Determine an indexed cache set using    │
│ the set index bits, the indexed cache   │
│ set including multiple cache tags and   │
│ multiple cache lines, each respective   │
│ cache tag of the multiple cache tags    │
│ corresponding to a respective cache     │
│ line of the multiple cache lines        │
│                   904                   │
└─────────────────────────────────────────┘
                    │
                    ▼
┌─────────────────────────────────────────┐
│ After the determination is started,     │
│ receive a most significant bit (MSB)    │
│ portion of the memory address from the  │
│ interconnect as part of the memory      │
│ request, the MSB portion including      │
│ second tag bits                         │
│                   906                   │
└─────────────────────────────────────────┘
```

*Fig. 9*

CACHE MEMORY ADDRESSING

BACKGROUND

Computers often include a processor that is faster than the computer's main memory. To bridge this disparity in speed, many computers include a cache memory. Although the cache memory responds more quickly to memory requests from the processor, the cache memory is more expensive than the main memory for a same-sized storage. To account for the greater cost, the cache memory is often smaller than the main memory and therefore stores a subset of the information that can be stored in the main memory. When acting as a bridge between the processor and main memory, the cache memory satisfies processor memory requests instead of the main memory when the requested data is part of the subset of information stored by the cache memory. These multiple levels of memory—e.g., both cache and main memory—are an example of a hierarchical memory system. Hierarchical memory systems can be employed to balance system performance versus cost. Unfortunately, hierarchical memory systems can also introduce operational complexity that engineers and other computer designers strive to overcome.

BRIEF DESCRIPTION OF THE DRAWINGS

Apparatuses of and techniques for cache memory addressing are described with reference to the following drawings. The same numbers are used throughout the drawings to reference like features and components:

FIG. 5-1 illustrates a first part of an example technique for pipelined cache operation using a first portion of the memory address.

FIG. 5-2 illustrates a second part of the example technique for pipelined cache operation using a second portion of the memory address.

FIG. 8 illustrates example methods for an apparatus to implement cache memory addressing.

FIG. 9 illustrates other example methods for an apparatus to implement cache memory addressing.

DETAILED DESCRIPTION

Overview

Figure 1:
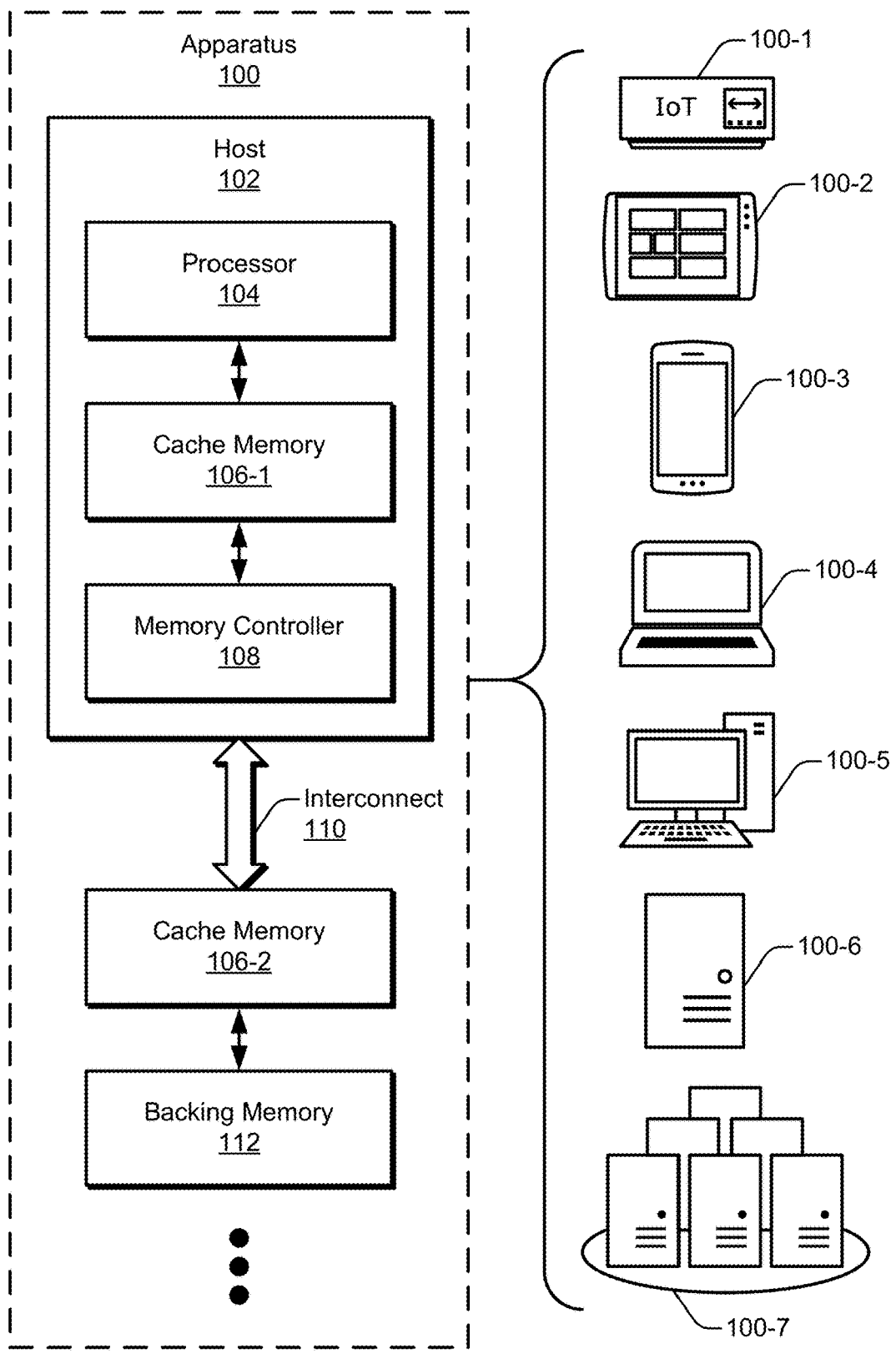
FIG. 1 illustrates an example apparatus that can implement cache memory addressing.

Computers provide services and features using a processor that is communicatively coupled to a memory. Because processors can use data faster than some memories can accommodate, a cache memory may be logically inserted between the processor and the memory. This transforms the memory into a slower backing memory for a faster cache memory, which can both be combined into a single memory device. To request data from this memory device, the processor provides to the memory device a memory request including a memory address of the data that is placed on an address bus. To respond to the memory request, a cache controller of the cache memory determines whether the requested data is currently present in an array of memory cells of the cache memory based on the memory address. In some cases, the address bus has a smaller width than the memory address. In other words, the memory address has more bits than can be simultaneously carried by the address bus. Because of this, the processor drives on the address bus different portions of the memory address sequentially instead of doing so simultaneously.

The multiple bits of the memory address can be separated, for example, into a most-significant bits (MSB) portion and a least-significant bits (LSB) portion. Some backing memories are constructed with dynamic random-access memory (DRAM). Due to a physical structure of DRAM, accessing DRAM is faster if the MSB portion of the memory address is provided to a memory device first. Many memory protocols, therefore, stipulate that the MSB portion is placed on the address bus before the LSB portion.

In contrast to these memory protocols, this document describes techniques for providing an LSB portion of a memory address prior to providing an MSB portion. By so doing, the cache memory can begin processing the LSB portion before the MSB portion is received. This enables the cache memory to start locating the requested data after receiving a first portion of the memory address and before receiving a second portion. This order decreases an average time to respond to a memory request because, unlike DRAM, cache memory can be more-quickly accessed when the LSB portion is processed before the MSB portion. Decreasing the average response time speeds up the processing rate of the processor that is coupled to the memory device.

In more detail, when a cache memory is attempting to locate requested data, the cache controller of the cache memory separates a memory address into at least index bits and tag bits. The tag bits can include lower tag bits and upper tag bits. In some implementations, the LSB portion of the memory address includes the index bits plus the lower tag bits, while the MSB portion includes the upper tag bits. The described techniques involve pipelining the cache access to decrease the response time of the cache memory and the memory device. The cache controller can use the index bits of the LSB portion to index into the array of memory cells of the cache memory to determine an indexed cache set that might hold the requested data. This determination identifies multiple tags that correspond to the indexed cache set while awaiting receipt of the full set of tag bits. The cache controller therefore starts the determination of whether requested data is currently stored in the cache memory before all parts of the memory address are available. Accordingly, the cache controller accelerates the memory access to make the computer faster with this technique.

Furthermore, the described techniques can perform speculative operations to decrease the average response time for requested data by using the partial tag bits of the memory address that are received first. For example, the cache controller can check the corresponding cache tags of the multiple cache ways of the indexed cache set against the lower tag bits, which are received as part of the LSB portion of the memory address. The cache controller can check the lower tag bits using comparison circuits and can start before the upper tag bits are received in the MSB portion. By partially comparing the tags of the matching indexed cache set to the lower tag bits, partial tag match logic of the cache controller produces a predicted match result. If the lower tag bits match a cache tag corresponding to the matching indexed cache set, the partial tag match logic detects a predicted hit. Here, a predicted hit can correspond to a complete match based on incomplete, or partial, information—such as only a portion of the address bits of a memory request. In response to the predicted hit, the cache controller preloads the corresponding cache line into a register of the cache memory that is usable for outputting the cache line for transmission to the processor.

On the other hand, if the lower tag bits fail to match a cache tag of the matching indexed cache set, the partial tag match logic determines the predicted match result to be an actual miss. This means that the requested data is not currently present in the array of memory cells of the cache memory. The cache controller therefore initiates a data fetch with the backing memory (e.g., the DRAM) of the memory device using the currently available bits of the memory address. This enables the backing memory to start the process for retrieving the requested data. Thus, if the partial tag match logic detects an actual miss, the slower retrieval from the backing store can be started immediately. By starting immediately, the techniques further decrease an average response time by the memory device to the memory request from the processor.

The cache memory then receives the MSB portion of the memory address from the processor. Based on the upper tag bits of the MSB portion, the cache controller can perform a second part of the pipelined operations for cache memory accessing using the remaining tag bits of the memory address. The cache controller uses the comparison circuits to compare the corresponding tags of the matching indexed cache set against the upper tag bits that are received as part of the MSB portion of the memory address. This comparison may be limited to those tags that the partial-tag-match logic detected as being a predicted hit to save power or increase speed, depending on a quantity of comparison circuits.

If the upper tag bits also match the cache tag of a cache line in the indexed cache set, tag match logic of the cache controller confirms the predicted hit. Based on the predicted hit confirmation, the cache memory supplies the requested data from the register of the cache memory. If, on the other hand, the upper tag bits fail to match a cache tag of a cache line in the matching indexed cache set, then the tag match logic refutes the predicted hit. Accordingly, a fetch of the requested data is initiated to prepare the backing memory (e.g., the DRAM) to be accessed. After the backing memory has been readied for access, either due to the actual miss during the partial matching or due to the predicted hit being refuted during the full matching, the cache controller completes the data fetch operation with the backing memory. The memory device then supplies the requested data to the processor.

In these manners, the transmissions of different portions of a memory address are advantageously ordered to enable expedited processing of a memory request. A host device, which can include a processor or a memory controller, or both, sends a first portion of a memory address of the memory request to a memory device with a cache memory. The first portion of the memory address includes set index bits and first tag bits. Because the index bits are received as part of a first transmission of the memory request, a cache controller of the cache memory can start the cache hit/miss determination analysis without waiting for a second transmission to be received. This pipelining technique decreases a time for the cache memory to respond to the memory request. If a predicted hit is detected based on a partial tag match comparison using the first tag bits, the cache controller can preload into at least one register the one or more cache lines that likely satisfies the memory request. This preloading can also decrease an average response time. If an actual miss is detected using the first tag bits, the cache controller instead initiates a data fetch from a backing store of the memory device to further reduce an average response time to memory requests from the host device.

Thus, at this point, the memory device is prepared to rapidly respond to the memory request after receiving a second portion of the memory address. Cached data that is likely to be the target of the memory request is forward-positioned at an output register of the cache. Also, if the requested data is already known to be absent from the cache memory, the backing memory has been instructed to warm up the memory for data retrieval based on the address bits included in the first portion of the memory address. For the second part of the pipelined cache memory addressing, the host device sends the second portion of the memory address to the memory device. The second portion of the memory address includes second tag bits. Upon confirmation of the predicted hit using the second tag bits, the cache memory can transmit the data from the register to the host device. Upon refutation of the predicted hit, the cache controller can start a data fetch from the backing memory for these low-likelihood instances. Meanwhile, requested data for the actual miss scenario is already being fetched. Thus, cache memory addressing in a pipelined fashion with appropriate ordering of the bits of the memory address can accelerate responses to memory requests received from a host device and therefore speed up a computer. Employing the described partial tag matching with speculative preloading or early data fetching further accelerates responses to memory requests.

Example Operating Environment

FIG. 1 illustrates an example apparatus 100 that can implement cache memory addressing. The apparatus 100 can be realized as, for example, at least one electronic device. Example electronic-device implementations include an internet-of-things (IoTs) device 100-1, a tablet device 100-2, a smartphone 100-3, a notebook computer 100-4, a desktop computer 100-5, a server computer 100-6, and a server cluster 100-7. Other apparatus examples include a wearable device, such as a smartwatch or intelligent glasses; an entertainment device, such as a set-top box or a smart television; a motherboard or server blade; a consumer appliance; vehicles; industrial equipment; and so forth. Each type of electronic device includes one or more components to provide some computing functionality or feature.

In example implementations, the apparatus 100 includes at least one host 102, at least one processor 104, and at least one cache memory 106. The apparatus 100 can also include at least one memory controller 108, at least one interconnect 110, and at least one backing memory 112. The backing memory 112 may be realized with a DRAM device or module or a three-dimensional (3D) stacked DRAM device, such as a high bandwidth memory (HBM) device or a hybrid memory cube (HMC) device. Additionally or alternatively, the backing memory 112 may be realized with a storage-class memory device, such as one employing 3D XPoint™ or phase-change memory (PCM). Other examples of the backing memory 112 are described herein. As shown, the host 102, or host device 102, includes the processor 104, a cache memory 106-1, and the memory controller 108. The processor 104 is coupled to the cache memory 106-1, and the cache memory 106-1 is coupled to the memory controller 108. The processor 104 is also coupled, directly or indirectly, to the memory controller 108. The host 102 is coupled to a cache memory 106-2 via the interconnect 110. The cache memory 106-2 is coupled to the backing memory 112.

The depicted components of the apparatus 100 represent an example computing architecture with a hierarchical memory system. For example, the cache memory 106-1 is logically coupled between the processor 104 and the cache memory 106-2. Further, the cache memory 106-2 is logically coupled between the processor 104 and the backing memory 112. Here, the cache memory 106-1 is at a higher level of the hierarchical memory system than is the cache memory 106-2. Similarly, the cache memory 106-2 is at a higher level of the hierarchical memory system than is the backing memory 112. The indicated interconnect 110, as well as the other interconnects that communicatively couple together various components, enable data to be transferred between or among the various components. Interconnect examples include a bus, a switching fabric, one or more wires that carry voltage or current signals, and so forth.

Although particular implementations of the apparatus 100 are depicted in FIG. 1 and described herein, an apparatus 100 can be implemented in alternative manners. For example, the host 102 may include multiple cache memories, including multiple levels of cache memory. Further, at least one other cache memory and backing memory pair may be coupled "below" the illustrated cache memory 106-2 and backing memory 112. The cache memory 106-2 and the backing memory 112 may be realized in various manners. In some cases, the cache memory 106-2 and the backing memory 112 are both disposed on, or physically supported by, a motherboard with the backing memory 112 comprising "main memory." In other cases, the cache memory 106-2 comprises dynamic random-access memory (DRAM), and the backing memory 112 comprises flash memory or a magnetic hard drive. Nonetheless, the components may be implemented in alternative ways, including in distributed or shared memory systems. Further, a given apparatus 100 may include more, fewer, or different components.

Example Schemes, Techniques, and Hardware for Cache Memory Addressing

Figure 2:
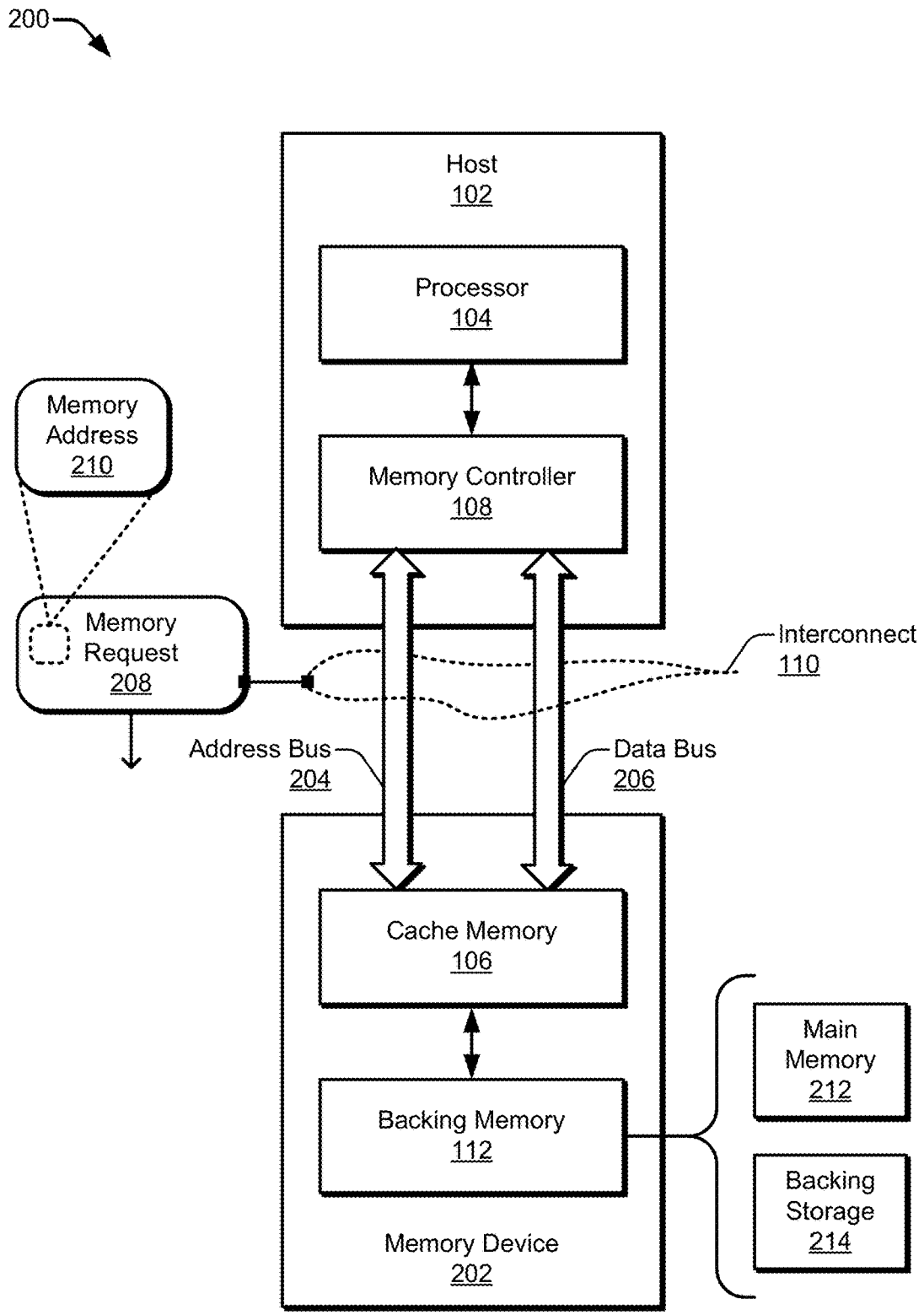
FIG. 2 illustrates an example interconnect between a host device and a memory device of the apparatus.

FIG. 2 illustrates, generally at 200, an example interconnect 110 extending between the host 102 and a memory device 202 of an apparatus (e.g., the apparatus 100 of FIG. 1). For clarity, the host 102 is depicted to include the processor 104 and the memory controller 108, but the host 102 may include more, fewer, or different components. In example implementations, the memory device 202 includes at least one cache memory 106 and at least one backing memory 112. The backing memory 112 serves as a backstop to handle memory requests that the cache memory 106 is unable to satisfy. The backing memory 112 can include a main memory 212, a backing storage 214, another cache memory (e.g., a larger cache memory at a lower hierarchical level followed by a main memory), a combination thereof, and so forth. For example, the backing memory 112 may include both the main memory 212 and the backing storage 214. Alternatively, the backing memory 112 may include the backing storage 214 that is fronted by the cache memory 106 (e.g., a solid-state drive (SSD) or magnetic drive may be mated with a DRAM-based cache memory). Further, the backing memory 112 may be implemented using the main memory 212, and the memory device 202 may therefore include the cache memory 106 and the main memory 212 that is organized or operated in one or more different configurations, such as storage-class memory. In some cases, the main memory 212 is formed from volatile memory while the backing storage 214 is formed from nonvolatile memory.

The host 102 is coupled to the memory device 202 via the interconnect 110. Here, the interconnect 110 is separated into at least an address bus 204 and a data bus 206. Accordingly, memory addresses are communicated via the address bus 204, and data are communicated via the data bus 206. Memory requests—such as commands, messages, or instructions—can be communicated on the address bus 204, the data bus 206, a command bus (not shown), or a combination thereof.

In some cases, the host 102 and the memory device 202 are implemented as separate integrated circuit (IC) chips. In other words, the host 102 may include at least one IC chip, and the memory device 202 may include at least one other IC chip. These chips may be in separate packages or modules, may be mounted on a same printed circuit board (PCB), may be disposed on separate PCBs, and so forth. In each of these environments, the interconnect 110 can provide an inter-chip coupling between the host 102 and the memory device 202. An interconnect 110 can operate in accordance with one or more standards. Example standards include DRAM standards published by JEDEC (e.g., DDR, DDR2, DDR3, DDR4, DDR5, etc.); stacked memory standards, such as those for High Bandwidth Memory (HBM) or Hybrid Memory Cube (HMC); a peripheral component interconnect (PCI) standard, such as the Peripheral Component Interconnect Express (PCIe) standard; the Compute Express Link (CXL) standard; the HyperTransport™ standard; the InfiniBand standard; and the External Serial AT Attachment (eSATA) standard. In addition or in alternative to a wired connection, the interconnect 110 may be or may include a wireless connection, such as a connection that employs cellular, wireless local area network (WLAN), wireless personal area network (WPAN), or passive network standard protocols. The memory device 202 can be realized as a memory card that supports the host 102. Although only one memory device 202 is shown, the host 102 may be coupled to multiple memory devices 202 using one or multiple interconnects 110.

In example operations, the host 102 generates a memory request 208. Within the host 102, the processor 104 determines that data is to be requested. In response, the memory controller 108 formulates the memory request 208 and places the memory request 208 on the interconnect 110. The memory controller 108 can include a memory request queue and management logic (not shown). The management logic organizes, orders, and otherwise processes multiple memory requests to issue them efficiently to one or more memory devices 202. The memory controller 108 can also interleave different portions of a particular memory request 208 with other memory requests to facilitate faster performance by the one or more memory devices 202. The memory request 208 includes at least a memory address 210. The memory controller 108 places or drives the memory address 210 on the address bus 204, and the address bus 204 propagates the memory address 210 to the memory device 202. This propagation is dependent on the relative widths of the address bus 204 and the memory address 210 of the memory request 208. The memory address part of the memory request 208 and example propagation approaches are described next with reference to FIG. 3.

Figure 3:
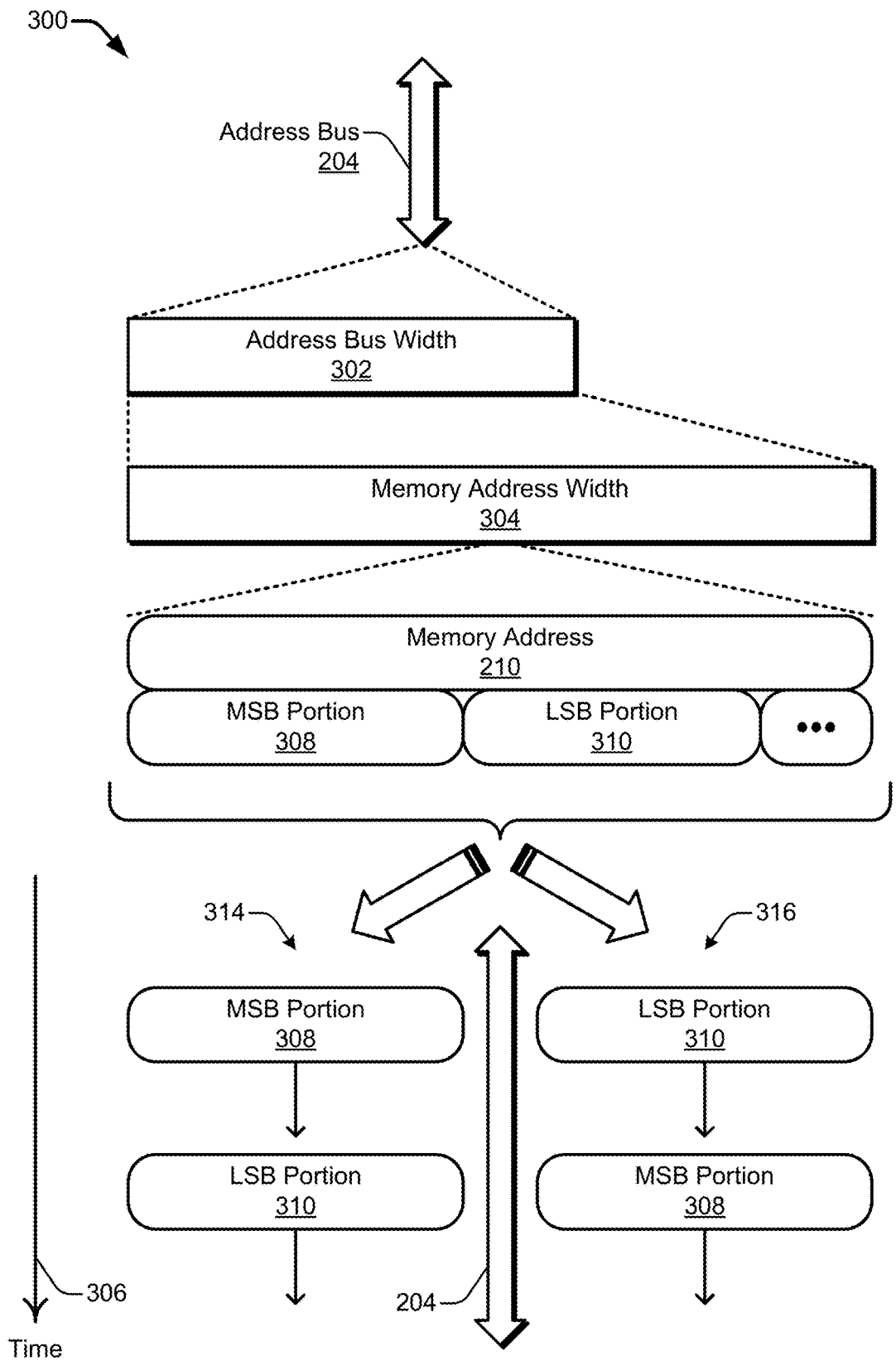
FIG. 3 illustrates an example relationship between an address bus of the interconnect and multiple portions of a memory address.

FIG. 3 illustrates an example relationship 300 between the address bus 204 of the interconnect 110 (e.g., of FIG. 2) and multiple portions of a memory address 210. The address bus 204 has an address bus width 302 with a first bit-width. The memory address 210 of a memory request 208 (of FIG. 2) has a memory address width 304 with a second bit-width. In some environments, the second bit-width is greater than the first bit-width. In other words, the memory address 210 is wider than the address bus 204. This means that the memory address 210 is placed on the address bus 204 in different memory address portions across different times.

In example implementations, the memory address 210 includes or is separated into different portions, such as at least a first portion and a second portion. As shown, the memory address 210 includes a most significant bit (MSB) portion 308 and a least significant bit (LSB) portion 310. As represented by the block with the ellipsis, the memory address 210 may include other bits, such as offset bits. The ratio or allocation of bits may vary based on a given cache architecture. For instance, as a cache line size increases, a quantity of offset bits increases, but a quantity of index bits decreases (assuming a quantity of cache ways is the same in both architectures). To communicate both portions from the host 102 to the memory device 202, the memory controller 108 places the portions onto the address bus 204 in some temporal order. Two example temporal order approaches for cache memory addressing are described: a first cache-memory-addressing approach 314 and a second cache-memory-addressing approach 316.

These two approaches are depicted relative to a time axis 306 that increases in a downward direction. In the first cache-memory-addressing approach 314, the memory controller 108 places the MSB portion 308 on the address bus 204 first and places the LSB portion 310 on the address bus 204 second. With DRAM requested data is located at an intersection of a column and a row of a grid of memory bit locations. A DRAM is accessed by first activating a row and then selecting a column. The MSBs of the memory address indicate the target row, and the LSBs indicate the target column. Thus, with DRAM-based memory, a memory device can begin processing a memory request upon receipt of the MSB portion 308 and before the LSB portion 310 is received. By way of example, double data rate (DDRx) memory can operate with a split memory address in which the MSB portion 308 is received before the LSB portion 310.

In contrast, cache memory operates differently. Cache memory includes multiple cache tags and an array of memory cells with multiple cache sets. The cache memory is accessed by indexing into a cache set and then inspecting one or more cache tags corresponding to the indexed cache set. The MSBs of the memory address are matched to the cache tags, and the LSBs are indexed to the target cache set. Due to this accessing order with a cache memory, a memory device with a cache front-end cannot begin processing a memory request upon receipt of the MSB portion 308 under the first cache-memory-addressing approach 314. Instead, the memory device waits until the LSB portion 310 has been received. This increases the response time of the memory device to a memory request and slows computer operation.

The second cache-memory-addressing approach 316 is tailored to accelerate how quickly a memory device 202 (of FIG. 2) can respond to a memory request 208 if the memory device 202 includes a cache memory 106. With the second cache-memory-addressing approach 316, the memory controller 108 places the LSB portion 310 on the address bus 204 first and places the MSB portion 308 on the address bus 204 second. Thus, the memory device 202 receives the LSB portion 310 prior to receiving the MSB portion 308. Upon receipt of the LSB portion 310, the memory device 202 can begin processing the memory request 208 before the MSB portion 308 is received. For example, the memory device 202 can use the LSBs of the LSB portion 310 to identify the indexed cache set targeted by the memory request 208. In this manner, the memory device 202 can start processing the memory request 208 sooner using the second cache-memory-addressing approach 316 as compared to using the first cache-memory-addressing approach 314. This second cache-memory-addressing approach 316 is described next with reference to FIG. 4.

Figure 4:
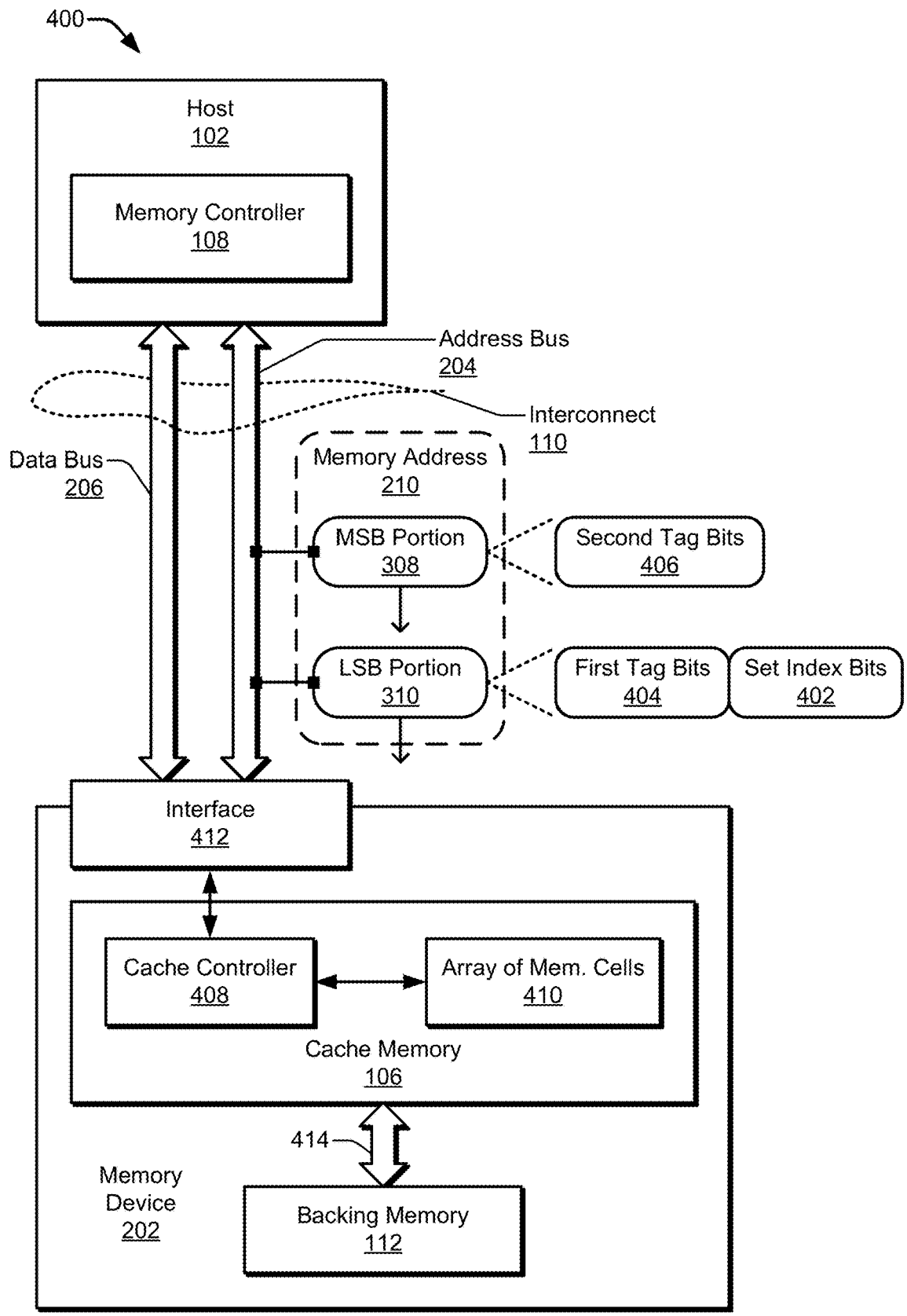
FIG. 4 illustrates an example apparatus for communicating the multiple portions of the memory address between the host device and the memory device, which includes a cache memory.

FIG. 4 illustrates an example apparatus 400 for communicating multiple portions of the memory address 210 between the host 102 and the memory device 202, which includes the cache memory 106. Thus, the apparatus 400 can include the host 102, which includes the memory controller 108, and the memory device 202. As shown, the memory device 202 includes an interface 412, an interconnect 414, and the backing memory 112 in addition to the cache memory 106. The memory device 202 is coupled to the interconnect 110 via the interface 412. The memory device 202 is therefore coupled to the address bus 204 and the data bus 206 via the interface 412. The cache memory 106 is coupled to the backing memory 112 via the interconnect 414. The cache memory 106 can store a subset of the data stored by the backing memory 112.

The cache memory 106 includes a cache controller 408 and at least one array of memory cells 410. Example implementations of the array of memory cells 410 are described below with reference to FIGS. 5-1 and 5-2. The cache controller 408 controls operation of the cache memory 106 and interoperation with the array of memory cells 410 as described herein. The cache controller 408 is coupled to the interface 412 and the array of memory cells 410. The cache memory 106 can therefore access the address bus 204 and the data bus 206 using the interface 412. Although not so shown in FIG. 4, the array 410 can be "directly" connected to the interface 412.

In example implementations, the host 102 sends the multiple portions of the memory address 210 over the address bus 204 to the interface 412. In accordance with the second cache-memory-addressing approach 316, the host 102 initially sends the LSB portion 310 and subsequently sends the MSB portion 308. As illustrated, the LSB portion 310 includes at least set index bits 402. This enables the cache controller 408 to start indexing into the array 410 before the MSB portion 308 arrives. Thus, prior to reception of the MSB portion 308 of the memory address 210, the cache controller 408 can start indexing into the array 410 using the LSB portion 310 of the memory address 210 to reduce an access time to the cache memory 106 and thus an average access time for the memory device 202. The LSB portion 310 may also include part of the tag bits, while the MSB portion 308 includes the remaining tag bits. Here, the LSB portion 310 includes first tag bits 404, and the MSB portion 308 includes second tag bits 406. The first tag bits 404 include lower-order bits of the tag bits, and the second tag bits 406 include upper-order bits of the tag bits. Use of the set index bits 402, the first tag bits 404, and the second tag bits 406 is described below with reference to FIGS. 5-1 and 5-2.

To efficiently manage multiple memory devices, the memory controller 108 may interleave other memory requests or portions thereof between sending the LSB portion 310 and the MSB portion 308. In other words, first and second portions of a memory address 210 may not be transmitted over the address bus 204 consecutively without one or more other intervening transmissions. Because these intervening transmissions increase a length of time between transmissions of the first and second portions, the second approach 316 to ordering portions of a memory address 210 may provide an additional decrease to the accessing time for a given memory request in these situations.

Some described implementations pertain to a backing memory 112 that operates as a main memory (e.g., that is built from DRAM) and that is fronted by a cache memory 106. However, described implementations, including the apparatus 400, can pertain to other environments. These environments can include those with, for instance, a backing memory 112 that is accessed by row first and column second (e.g., with MSBs first and then LSBs second) wherein the backing memory 112 is fronted by a cache memory 106. For example, a memory device 202 may include a cache memory 106 and a backing memory 112 that is formed from nonvolatile memory (NVM) (e.g., flash memory). In this case, the cache memory 106 can be formed from SRAM or DRAM. A memory device 202 can additionally operate in accordance with Serial Advanced Technology Attachment (SATA), Universal Serial Bus (USB), or Peripheral Component Interconnect (PCI) technologies, just to name a few examples. Thus, an interconnect 110 may also be implemented in different manners. For example, the interconnect 110 can comport with one of the above-listed technologies or a serial bus generally. For instance, with a serial bus implementation of the interconnect 110, the memory controller 108 can sequentially transmit to the memory device 202 a memory request command, then the LSB portion 310, and then the MSB portion 308.

Figures 1, 5:
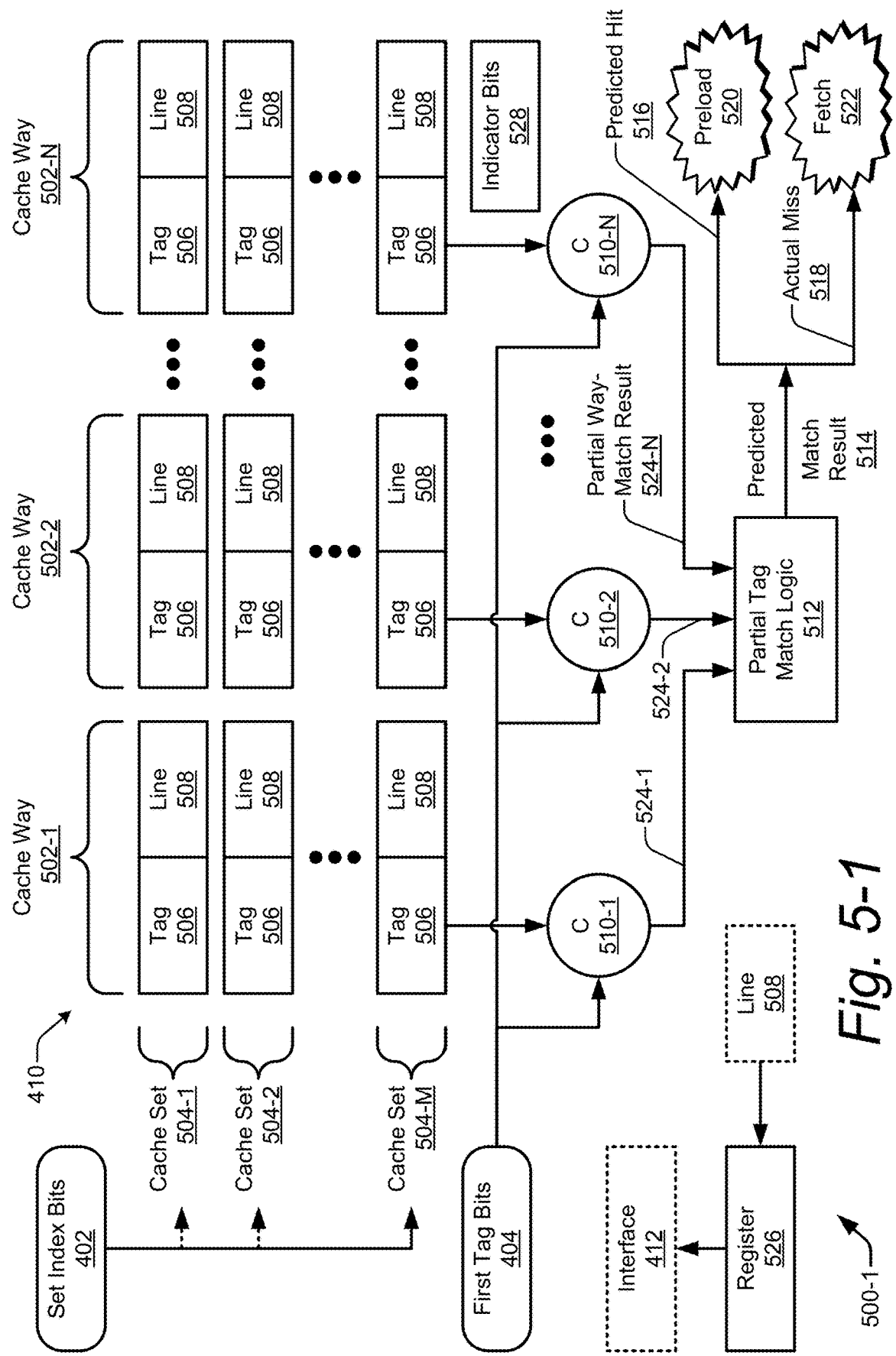
Figures 2, 5:
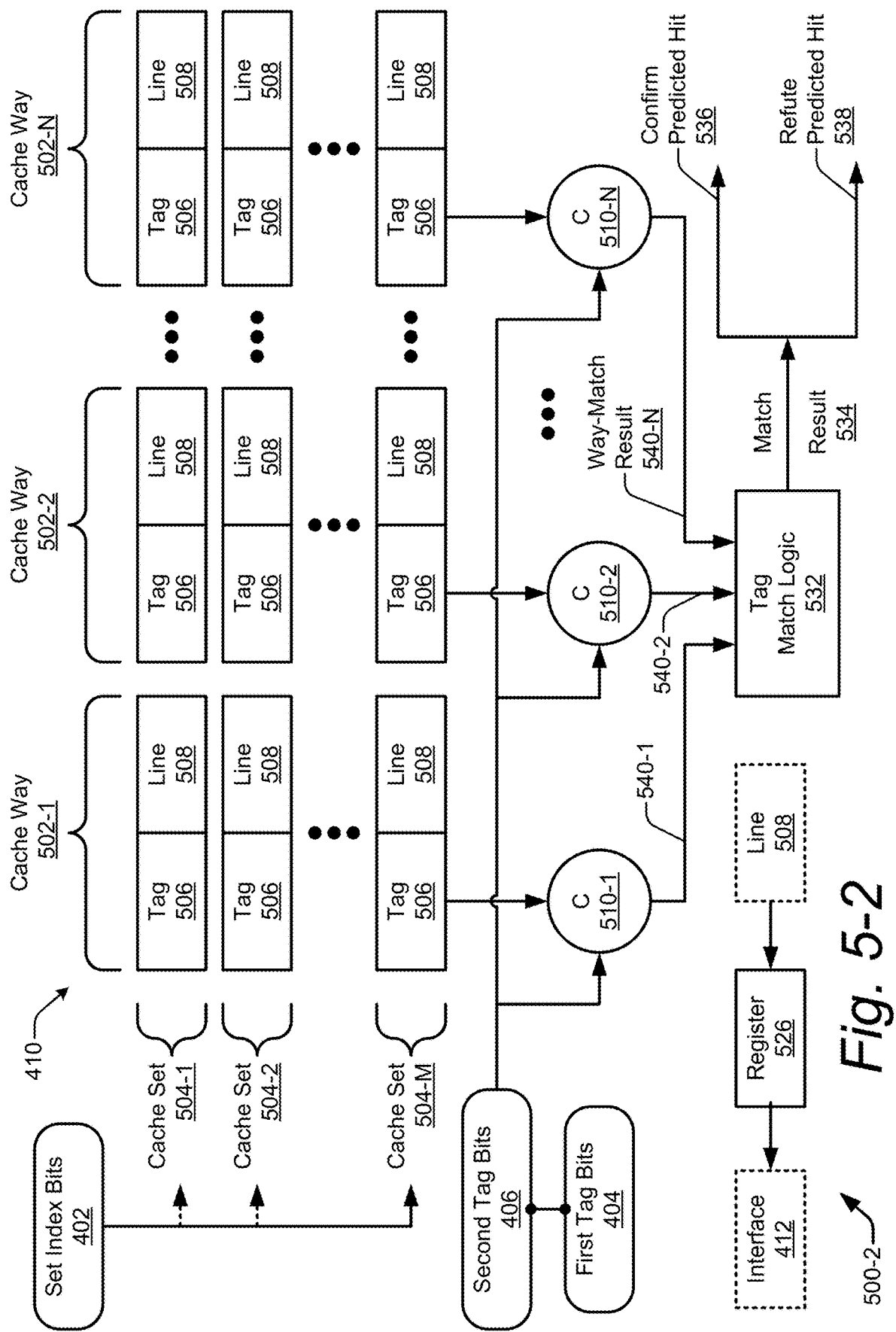

FIG. 5-1 illustrates a first part 500-1 of an example technique for pipelined cache operation using a first portion of the memory address 210 (e.g., of FIG. 3). The first portion in this example is the LSB portion 310 (e.g., of FIGS. 3 and 4) with set index bits 402 and first tag bits 404. As illustrated, the array of memory cells 410 includes multiple cache ways 502-1, 502-2, . . . , 502-N and multiple cache sets 504-1, 504-2, . . . , 504-M, with "N" and "M" each representing a positive integer. Although certain principles are described in terms of a cache memory with multiple sets (e.g., where N is greater than one for an N-way set-associative cache), the principles are applicable to a cache memory with a single way (e.g., where N is equal to one for a direct-mapped cache).

The array of memory cells 410 also includes multiple cache lines 508 and can include multiple cache tags 506. Alternatively, the multiple cache tags 506 can be part of another aspect of the cache memory 106. Each cache line 508 stores a line of data, which may include one or more bytes (e.g., 32 bytes or 256 bytes). Each respective cache line 508 of the multiple cache lines corresponds to a respective cache tag 506 of the multiple cache tags. The multiple cache lines 508 and the multiple cache tags 506 are organized "vertically" (as depicted by way of example in FIG. 5-1) into the multiple cache ways 502-1 . . . 502-N and "horizontally" into the multiple cache sets 504-1 . . . 504-M. Although each tag 506 and line 508 are shown as being co-located, a physical structure of the array of memory cells 410 may differ. Further, the multiple tags 506 may be physically or logically part of the cache controller 408 (of FIG. 4).

The cache controller 408 includes at least one register 526, partial tag match logic 512, and multiple comparator circuits 510-1, 510-2, . . . , 510-N. Thus, the cache controller 408 may include a respective comparator circuit 510 (C 510) for each respective cache way 502. Alternatively, even if a cache memory includes multiple cache ways, fewer comparator circuits (e.g., as few as a single comparator circuit 510) can be employed to save space at the cost of decreased speed by using the fewer comparator circuits in a serial fashion across the multiple cache ways. To perform a comparison, which is described below, each respective comparator circuit 510 is coupled to receive a tag 506 from a respective column of tags 506 that corresponds to a given cache way 502.

In example implementations, the cache controller 408 receives the set index bits 402 as part of a first portion of a memory address 210 (e.g., of FIG. 3), such as part of an LSB portion 310 (e.g., of FIGS. 3 and 4). The cache controller 408 uses the set index bits 402 of the LSB portion 310 to index into the multiple cache sets 504-1 . . . 504-M. This enables the cache memory 106 to start indexing into the multiple cache sets to determine an indexed cache set of the multiple cache sets prior to receipt of the MSB portion 308 of the memory address 210. In the illustrated example, the indexed cache set corresponds to the cache set 504-M.

Thus, the cache memory 106 can determine the indexed cache set 504-M using the portion of the memory address 210 that is received first to accelerate the processing of a memory request 208. The cache memory 106 can further speculatively perform an operation using partial information. The LSB portion 310 also includes the first tag bits 404. These lower-order tag bits can be checked against the tags 506 of the indexed cache set 504-M to determine if there is a match to these first tag bits 404, which qualifies as a partial match to the complete set of tag bits. From a probabilistic perspective, this partial match indicates a likely match overall, so action can be taken on a speculative basis with a good likelihood that the speculative action will prove to be a correct action.

Continuing with an example operation, the cache controller 408 performs a partial tag match operation using the first tag bits 404 based on the indexed cache set 504-M. The cache controller 408 routes the first tag bits 404 and a respective cache tag 506 from the indexed cache set 504-M to each respective comparator circuit 510 of the multiple comparator circuits 510-1 . . . 510-N. Each comparator circuit 510 compares the first tag bits 404 to the respective cache tag 506 to determine a respective partial way-match result 524. Thus, the cache controller 408 produces multiple partial way-match results 524-1, 524-2, . . . , 524-N. Each partial way-match result 524 can be implemented as, for example, a Boolean value indicative of whether or not the respective cache tag 506 matches the first tag bits 404.

Each cache line 508 in each cache way 502 and along each cache set 504 can include one or more indicator bits 528. Examples of indicator bits 528 include a valid bit, a dirty bit, a replacement information bit (e.g., for a least-recently-used (LRU) analysis), and so forth. Thus, each cache line 508 may be associated with a valid bit indicative of whether the cache line 508 holds valid data. If a given cache line 508 does not have valid data, some power can be saved by excluding the corresponding cache tag 506 from the comparison with the comparison circuit 510.

The cache controller 408 couples the multiple partial way-match results 524-1 . . . 524-N that are output from the multiple comparator circuits 510-1 . . . 510-N to the partial tag match logic 512. The partial tag match logic 512 produces a predicted match result 514 based on the multiple partial way-match results 524-1 . . . 524-N. For example, if at least one partial way-match result 524 is positive for a match, then the predicted match result 514 is affirmative and corresponds to a predicted hit 516. In some environments, the predicted hit 516 corresponds to a match on the available, but partial, address bits of a memory request responsive to a comparison with a portion of the bits in at least one tag 506. Because a portion of the address bits are compared, a predicted hit 516 can represent a partial match to, or a predicted match result 514 for, multiple tags 506 of multiple cache ways 502. Responsive to the predicted hit 516, the cache controller 408 performs a preload operation 520. The preload operation 520 includes loading the at least one cache line 508 corresponding to the positive partial way-match result 524 into the at least one register 526, which is depicted in the lower-left corner of FIG. 5-1. Although this preload operation 520 is speculative, the partial match is probabilistically a likely hit due to recency and locality traits of code execution. Thus, once the predicted hit 516 is confirmed (as described below with reference to FIG. 5-2), the confirmed cache line 508 can be more quickly provided from the register 526 to the interface 412 for transmission over the interconnect 110 to the host 102.

If, on the other hand, no partial way-match result 524 is positive, then the predicted match result 514 is negative and corresponds to an actual miss 518. In other words, a miss with part of the tag bits renders any remaining tag bits irrelevant. Accordingly, the cache controller 408 performs a fetch operation 522 to fetch data from the backing memory 112 (e.g., of FIG. 4). The cache controller 408 can start this fetch operation 522 without checking any additional tag bits. Further, the fetch operation 522 can be at least started without receiving any additional tag bits, such as the second tag bits 406 (e.g., of FIG. 4). Example implementations of a data fetch operation with the backing memory 112 are described below with reference to FIG. 6. The second tag bits 406 can, however, impact operation in a scenario with a predicted hit 516. This is described next with reference to FIG. 5-2.

FIG. 5-2 illustrates a second part 500-2 of the example technique for pipelined cache operation using a second portion of the memory address 210 (e.g., of FIG. 3). The second portion in this example is the MSB portion 308 (e.g., of FIGS. 3 and 4) with the second tag bits 406. Continuing with the example operation described above for the first part 500-1, the cache controller 408 performs a "full" tag match operation using at least the second tag bits 406 based on the indexed cache set 504-M. The cache controller 408 can route the second tag bits 406 and a respective cache tag 506 from the indexed cache set 504-M to each respective comparator circuit 510 of the multiple comparator circuits 510-1 . . . 510-N. Each comparator circuit 510 compares the second tag bits 406 to the respective cache tag 506 to determine a respective way-match result 540. Thus, the cache controller 408 produces multiple way-match results 540-1, 540-2, . . . , 540-N. Each way-match result 540 can be implemented as, for example, a Boolean value to indicate a match or a lack of a match.

This comparison operation can be performed in different manners. For example, the cache controller 408 can compare a "full" set of tag bits that includes both the first tag bits 404 and the second tag bits 406 to the cache tags 506 of each cache way 502. Alternatively, the cache controller 408 can focus this comparison on the one or more cache tags 506 that correspond to the one or more cache ways 502 that produced the predicted hit 516 (of FIG. 5-1). Thus, the cache controller 408 can compare the second tag bits 406 to a portion of the cache tag 506 for only those cache ways 502 that matched the first tag bits 404. The comparison operation can also be performed in other manners using the same or different comparison circuits as those used for the first part 500-1 of the example technique for pipelined cache operation.

The cache controller 408 couples the multiple way-match results 540-1 . . . 540-N that are output from the multiple comparator circuits 510-1 . . . 510-N to the tag match logic 532. The tag match logic 532 produces a match result 534 based on the multiple way-match results 540-1 . . . 540-N. For example, if a way-match result 540 is positive, then the match result 534 is affirmative and confirms the predicted hit at 536. Responsive to the confirmed predicted hit 536, the cache controller 408 drives the data of the cache line 508 from the register 526 onto the interconnect 110 (e.g., of FIG. 4) via the interface 412. The preload operation 520 of FIG. 5-1 can therefore save additional time if the predicted hit 516 is confirmed.

If, on the other hand, no way-match result 540 is positive, then the match result 534 is negative and refutes the predicted hit at 538. In other words, a miss has been determined for this memory request 208. Accordingly, the cache controller 408 begins a replacement procedure by determining which cache line 508 of the indexed cache set 504-M is to be the selected victim for replacement. The cache controller 408 also activates the underlying memory row of the backing memory 112 to prepare for loading the new address into the selected cache line 508. Thus, the replacement procedure also includes a fetch operation to fetch data from the backing memory 112 (e.g., of FIG. 4). Example implementations of a data fetch operation with the backing memory 112 are described next with reference to FIG. 6.

Figure 6:
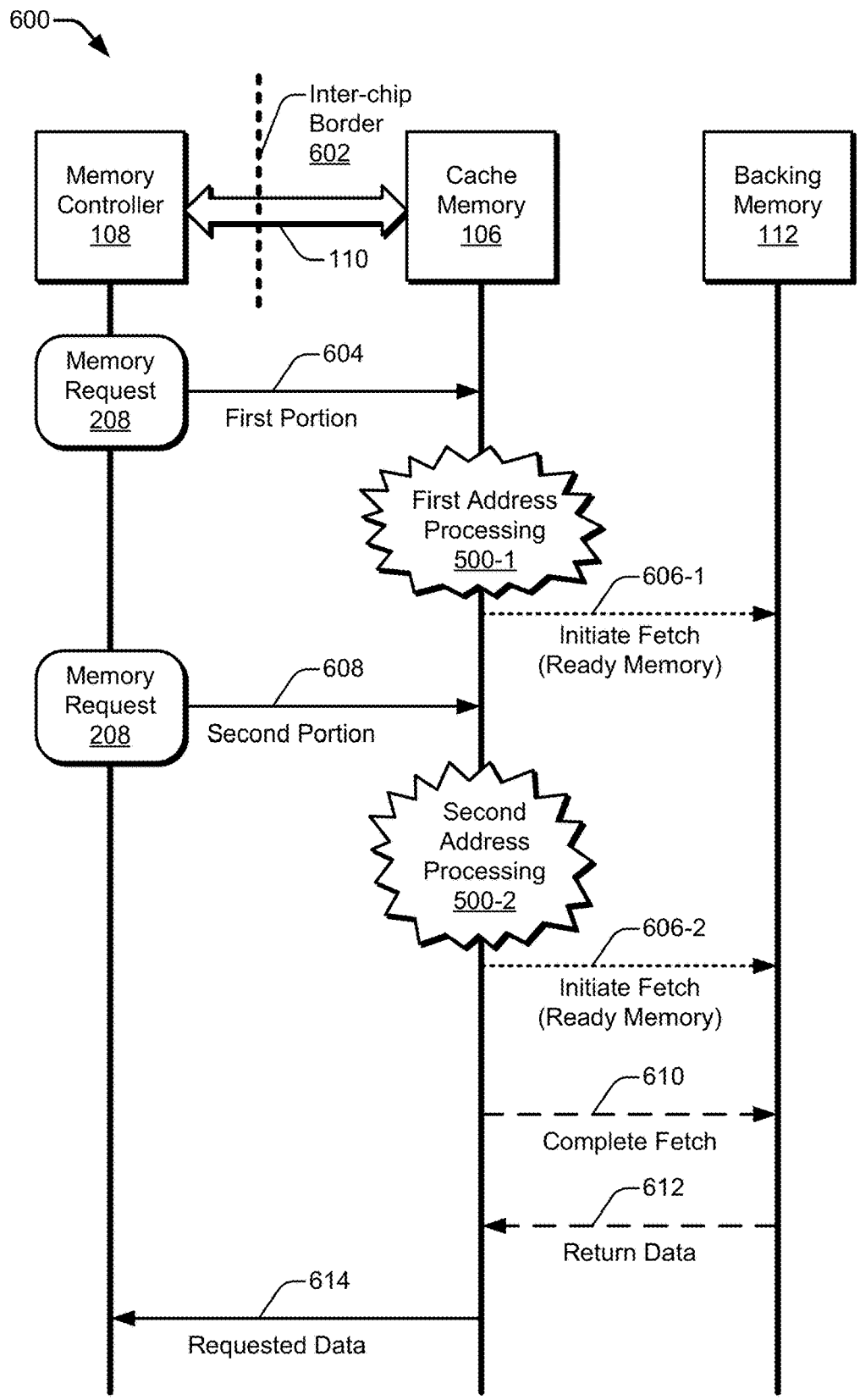
FIG. 6 illustrates an example sequence diagram for communications and operations that relate to a memory controller, a cache memory, and a backing memory in accordance with cache memory addressing.

FIG. 6 illustrates an example sequence diagram 600 for communications and operations that relate to the memory controller 108, the cache memory 106, and the backing memory 112 in accordance with cache memory addressing. In this example, the cache memory 106 and the backing memory 112 are disposed on a same IC chip or are packaged into a same module or card. In contrast, the memory controller 108 is on a separate IC chip as compared to that of the cache memory 106. Hence, there is an inter-chip border 602 between the memory controller 108 and the cache memory 106, and the inter-chip border 602 is spanned by the interconnect 110.

In example implementations, due to data that is to be used by a program that is executing on the processor 104 (e.g., of FIG. 2), the memory controller 108 formulates a memory request 208. The memory request 208 includes at least two portions of a memory address 210 (e.g., of FIG. 2). The memory controller 108 transmits a first portion 604 of the memory request 208 to the cache memory 106 using the interconnect 110. The first portion 604 may include set index bits 402 or first tag bits 404 (e.g., of FIG. 4), including both the set index bits 402 and the first tag bits 404. The first portion 604 may comprise the LSB portion 310 (e.g., of FIGS. 3 and 4) of the memory address 210. The memory controller 108 may transmit the first portion 604 as a first message for the memory request 208. In such cases, this first message may be realized as a row command in accordance with a non-cache-memory protocol, such as one for DDRx memory. Responsive to the transmission, the cache memory 106 receives the first portion 604 of the memory address 210 from the memory controller 108 via the interconnect 110 as part of the memory request 208.

With the set index bits 402 and the first tag bits 404 of the first portion 604, the cache memory 106 performs the first address-processing part 500-1 of FIG. 5-1. A cache controller 408 of the cache memory 106 determines an indexed cache set (e.g., the indexed cache set 504-M) using the set index bits 402. Based on the indexed cache set 504-M, partial tag match logic 512 of the cache controller 408 processes the first tag bits 404 to determine a predicted match result 514. If the predicted match result 514 corresponds to an actual miss 518, the cache memory 106 initiates a data fetch with the backing memory 112 at 606-1. The data fetch can prepare the backing memory 112 to be ready for an access to lower latency after the remaining address bits are received. For example, the cache memory 106 can provide sufficient address bit information so that the backing memory 112 can activate a bank, pre-charge a row, sense a charged row of storage, and so forth.

After the cache memory 106 begins performing the first address-processing part 500-1, the memory controller 108 transmits a second portion 608 of the memory request 208 to the cache memory 106 using the interconnect 110. The second portion 608 may include second tag bits 406 (e.g., of FIG. 4). The second portion 608 may comprise the MSB portion 308 (e.g., of FIGS. 3 and 4) of the memory address 210. The memory controller 108 may transmit the second portion 608 as a second message for the memory request 208. In such cases, this second message may be realized as a column command in accordance with a non-cache-memory protocol, such as one for DDRx memory.

After the transmission by the memory controller 108, the cache memory 106 receives the second portion 608 of the memory address 210 via the interconnect 110. Responsive to receiving the second portion 608, the cache memory 106 performs the second address-processing part 500-2 of FIG. 5-2 using the second tag bits 406. Tag match logic 532 of the cache controller 408 processes the second tag bits 406 to produce a match result 534. If a predicted hit 516 is refuted by the match result 534 (as indicated at 538 of FIG. 5-2), then the cache memory 106 initiates a data fetch with the backing memory 112 at 606-2 to ready the memory for accessing. Thus, if the backing memory 112 is to be accessed, a single instance of the initial data-fetch signaling at 606-1 or 606-2 can be implemented for any given memory request 208, but two data fetch initiations are unnecessary.

If there is a cache miss, the backing memory 112 receives the initiate data fetch command at either 606-1 or 606-2. Regardless of whether the data fetch is initiated at 606-1 or 606-2, the cache memory 106 completes the data fetch at 610 by sending the address bits that are received in the second portion 608 to the backing memory 112. These address bits may, for instance, enable a column to select data from sense amps that are readied by one of the earlier data-fetch initiation signals 606-1 or 606-2. The requested data can be obtained within the backing memory 112 by loading the requested data from the sense amps to an output register or buffer. The backing memory 112 returns the requested data to the cache memory 106 at the return data signaling 612.

The cache memory 106 provides the requested data to the memory controller 108 at requested data signaling 614 by transmitting the requested data over the interconnect 110. The requested data satisfies the memory request 208. The memory controller 108 receives the requested data at 614 from the cache memory 106 via the interconnect 110, which couples together two separate IC chips. If the predicted hit 516 is confirmed, then the requested data is forwarded from the register 526 that was preloaded during the first address processing part 500-1. Otherwise, with an actual miss 518 or a refuted predicted hit 538, the requested data is provided using the data returned to the cache memory 106 from the backing memory 112.

Example Methods for Cache Memory Addressing

Figure 7:
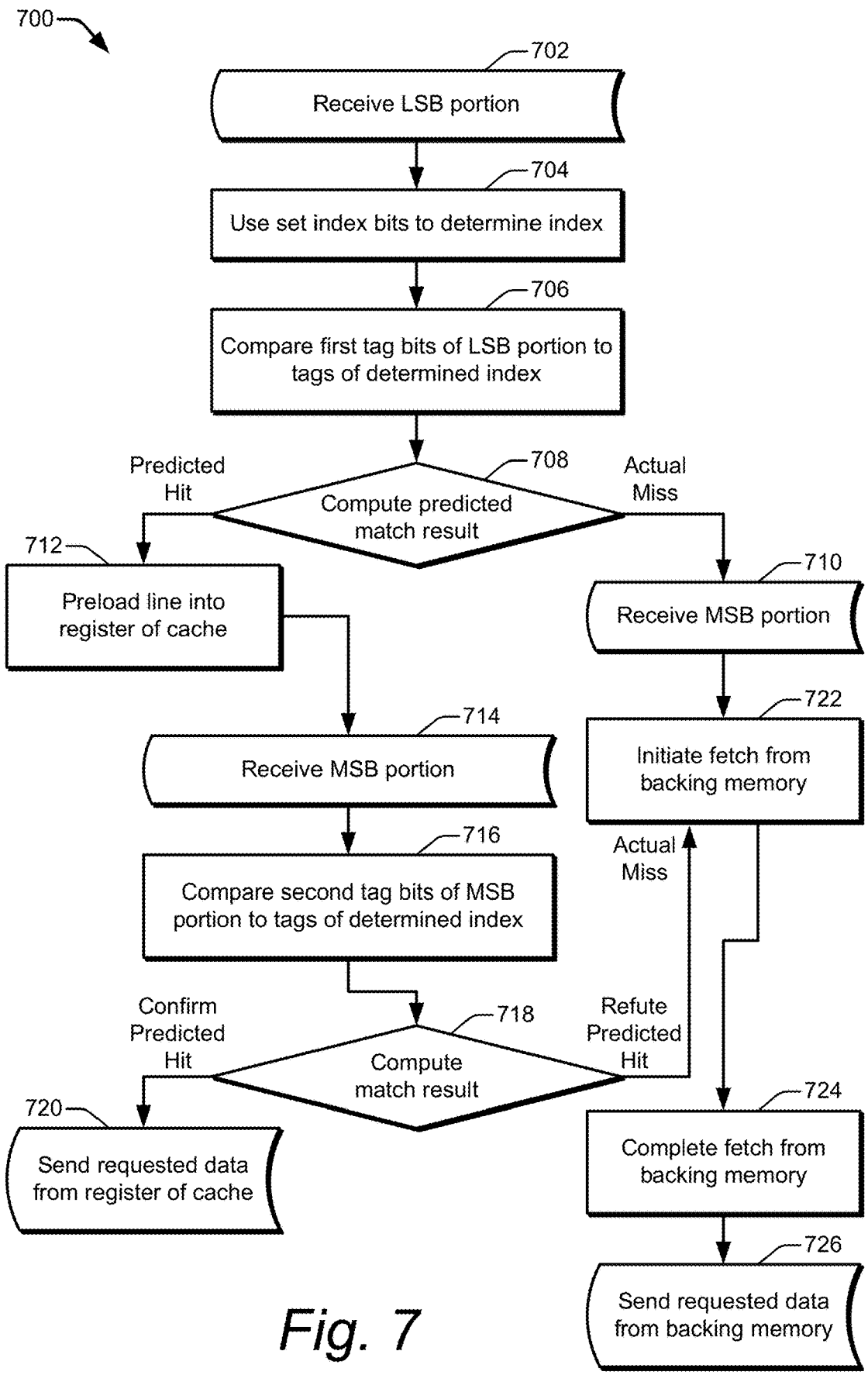
FIG. 7 illustrates an example flowchart depicting operations to be performed by a memory device, which includes a cache memory, in accordance with cache memory addressing.

Example methods are described in this section with reference to the flow charts and flow diagrams of FIGS. 7-9. These descriptions reference components, entities, and other aspects depicted in FIGS. 1-6 by way of example only. FIG. 7 illustrates an example flowchart 700 depicting operations to be performed by a memory device, which includes a cache memory, in accordance with cache memory addressing. The flowchart 700 includes twelve blocks 702 to 724. At 702, the cache memory 106 receives an LSB portion 310 from the host 102. At 704, the cache controller 408 determines an indexed cache set (e.g., the indexed cache set 504-M) of the multiple cache sets 504-1 . . . 504-M using the set index bits 402 of the LSB portion 310. At 706, the cache controller 408 compares the first tag bits 404 of the LSB portion 310 to cache tags 506 of the determined indexed cache set 504-M. At 708, the partial tag match logic 512 computes a predicted match result 514. If the partial tag match logic 512 detects an actual miss 518, then at 710, the cache memory 106 receives an MSB portion 308 from the host 102. At 722, the cache controller 408 initiates a data fetch from the backing memory 112 using fetch initiation signaling 606-1 and fetch completion signaling 610.

On the other hand, if the partial tag match logic 512 detects that the predicted match result 514 indicates a predicted hit 516, then at 712 the cache memory 106 preloads a line of data from the at least partially matching cache line 508 into a register 526 of the cache memory 106. At 714, the cache memory 106 receives an MSB portion 308 from the host 102. At 716, the cache controller 408 compares the second tag bits 406 of the MSB portion 308 to the cache tags 506 of the determined indexed cache set 504-M. The tag match logic 532 computes a match result 534 at 718. If the cache controller 408 confirms the predicted hit 516 based on the match result 534 (as depicted at 536 in FIG. 5-2), then at 720, the cache memory 106 sends the requested data from the register 526 to the host 102.

If, on the other hand, the cache controller 408 determines (at 718) that the match result 534 refutes the predicted hit 516 (as depicted at 538 in FIG. 5-2), then the cache memory 106 experiences an actual miss. Thus, the cache controller 408 initiates a data fetch at 722 with the backing memory 112 using fetch initiation signaling 606-2. After the data fetch is initiated, the cache memory 106 completes the data fetch from the backing memory 112 at 724 as illustrated at the return data 612 indication. At 726, the cache memory 106 sends the requested data, which was obtained from the backing memory, to the host 102.

FIG. 8 illustrates with a flow diagram 800 example methods for an apparatus to implement cache memory addressing. The flow diagram 800 includes four blocks 802 to 808. In example implementations, a host device 102 can perform the operations of the flow diagram 800. At 802, a processor of the host determines that data corresponding to a memory address is being referenced by a program, with the memory address including a most significant bit (MSB) portion and a least significant bit (LSB) portion. For example, a processor 104 of the host 102 can determine that data corresponding to a memory address 210 is being referenced by a program, with the memory address 210 including an MSB portion 308 and an LSB portion 310. In some cases, the processor 104 may be executing the program, and the program may need data at a particular memory location to perform some function. The processor 104 may therefore identify the memory location to a memory controller 108 using the corresponding memory address 210.

At 804, the memory controller of the host formulates a memory request for the data based on the memory address. For example, the memory controller 108 of the host 102 can formulate a memory request 208 for the data based on the memory address 210. For instance, to accommodate a bus width of an address bus 204 that is less than a width of the memory address 210, the memory controller 108 may split the memory address 210 into two or more portions that can be sequentially placed on the address bus 204. In some environments, the processor 104 or the memory controller 108, including potentially both, may interpret the MSB portion 308 to correspond to at least part of a row address and may interpret the LSB portion 310 to correspond to at least part of a column address of the data that is targeted by the memory request 208.

At 806, a first message for the memory request is transmitted to a cache memory over an interconnect, with the first message including the LSB portion of the memory address. For example, the memory controller 108 can transmit a first message for the memory request 208 to a cache memory 106 over an interconnect 110, with the first message including the LSB portion 310 of the memory address 210. To do so, the memory controller 108 may drive voltages on the address bus 204 part of the interconnect 110 as part of a memory command for a memory device 202 that includes a backing memory 112 as well as the cache memory 106. The first message may include at least set index bits for accessing an array of memory cells 410 of the cache memory 106. This enables the cache memory 106 to start processing the memory request 208 before all portions of the memory request 208 have been received by the cache memory 106 and even before all portions have been transmitted by the host 102.

At 808, after the transmitting of the first message, a second message for the memory request is transmitted to the cache memory over the interconnect, with the second message including the MSB portion of the memory address. For example, after transmission of the first message, the memory controller 108 can transmit a second message for the memory request 208 to the cache memory 106 over the interconnect 110, with the second message including the MSB portion 308 of the memory address 210. The second message may include at least some of the tag bits for accessing the array of memory cells 410. With receipt of the second message, the cache memory 106 may continue or complete an operation of checking for a hit on the requested data using the tag bits.

FIG. 9 illustrates with a flow diagram 900 other example methods for an apparatus to implement cache memory addressing. The flow diagram 900 includes three blocks 902 to 906. In example implementations, a memory device 202 can perform the operations of the flow diagram 900. At 902, a least significant bit (LSB) portion of a memory address is received from an interconnect as part of a memory request, with the LSB portion including set index bits and first tag bits. For example, a cache memory 106 can receive an LSB portion 310 of a memory address 210 from an interconnect 110 as part of a memory request 208, with the LSB portion 310 including set index bits 402 and first tag bits 404. In some cases, the cache memory 106 may receive the LSB portion 310 as part of a memory command for the memory device 202 if the cache memory 106 functions as a manager or controller for the memory device 202. In other cases, a cache controller 408 of the cache memory 106 may operate as part of a memory control unit for the memory device 202.

At 904, an indexed cache set is determined using the set index bits, with the indexed cache set including multiple cache tags and multiple cache lines, and with each respective cache tag of the multiple cache tags corresponding to a respective cache line of the multiple cache lines. For example, the cache controller 408 of the cache memory 106 can determine an indexed cache set (e.g., cache set 504-M) using the set index bits 402. The indexed cache set 504-M can include multiple cache tags 506 and multiple cache lines 508, and each respective cache tag 506 of the multiple cache tags can correspond to a respective cache line 508 of the multiple cache lines. For instance, the cache controller 408 may decode the set index bits 402 to map them to a particular cache set 504-M that corresponds to the set index bits 402. The cache controller 408 may also start processing the first tag bits 404 by comparing them to part of each of the multiple cache tags 506 of the indexed cache set 504-M to detect a predicted hit 516 or an actual miss 518.

At 906, after the determining is started, a most significant bit (MSB) portion of the memory address is received from the interconnect as part of the memory request, with the MSB portion including second tag bits. For example, after the determination of the indexed cache set 504-M is started, the cache memory 106 can receive an MSB portion 308 of the memory address 210 from the interconnect 110 as part of the memory request 208, with the MSB portion 308 including second tag bits 406. To do so, the memory device 202 may latch into the interface 412 a memory command from an address bus 204 of the interconnect 110. The cache controller 408 may then use the second tag bits 406 to confirm or refute the predicted hit 516 before providing requested data in response to the memory request 208.

For the flow charts and flow diagrams described above, the orders in which operations are shown and/or described are not intended to be construed as a limitation. Any number or combination of the described process operations can be combined or rearranged in any order to implement a given method or an alternative method. Operations may also be omitted from or added to the described methods. Further, described operations can be implemented in fully or partially overlapping manners.

Aspects of these methods may be implemented in, for example, hardware (e.g., fixed-logic circuitry or a processor in conjunction with a memory), firmware, or some combination thereof. The methods may be realized using one or more of the apparatuses or components shown in FIGS. 1-6, the components of which may be further divided, combined, rearranged, and so on. The devices and components of these figures generally represent firmware or the actions thereof; hardware, such as electronic devices, packaged modules, IC chips, or circuits; software; or a combination thereof. The illustrated apparatuses 100 and 400 include, for instance, a host 102, a memory device 202, and an interconnect 110. The host 102 can include a processor 104 and a memory controller 108. The memory device 202 can include a cache memory 106, a backing memory 112, and an interface 412. The cache memory 106 can include a cache controller 408 and an array of memory cells 410. Thus, these figures illustrate some of the many possible systems or apparatuses capable of implementing the described methods.

Unless context dictates otherwise, use herein of the word "or" may be considered use of an "inclusive or," or a term that permits inclusion or application of one or more items that are linked by the word "or" (e.g., a phrase "A or B" may be interpreted as permitting just "A," as permitting just "B," or as permitting both "A" and "B"). Also, as used herein, a phrase referring to "at least one of" a list of items refers to any combination of those items, including single members. For instance, "at least one of a, b, or c" can cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c, or any other ordering of a, b, and c). Further, items represented in the accompanying figures and terms discussed herein may be indicative of one or more items or terms, and thus reference may be made interchangeably to single or plural forms of the items and terms in this written description.

Conclusion

Although implementations for cache memory addressing have been described in language specific to certain features and/or methods, the subject of the appended claims is not necessarily limited to the specific features or methods described. Rather, the specific features and methods are disclosed as example implementations for cache memory addressing.

The invention claimed is:

1. A method comprising:
receiving a least significant bit (LSB) portion of a memory address from multiple wires of an address bus of an inter-chip interconnect as part of a memory request, the LSB portion including set index bits and first tag bits;
prior to receiving a most significant bit (MSB) portion of the memory address, determining an indexed cache set of a cache memory using the set index bits, the indexed cache set including multiple cache tags and multiple cache lines, each respective cache tag of the multiple cache tags corresponding to a respective cache line of the multiple cache lines; and
after the determining is started, receiving the MSB portion of the memory address from the multiple wires of the address bus of the inter-chip interconnect as part of the memory request, the MSB portion including second tag bits.

2. The method of claim 1, further comprising:
comparing the first tag bits to the multiple cache tags of the indexed cache set; and
identifying data in the cache memory in response to the memory request based at least in part on comparing the first tag bits.

3. The method of claim 2, further comprising:
after the comparing with the first tag bits, comparing the second tag bits to at least one cache tag of the multiple cache tags of the indexed cache set; and
transferring the identified data from the cache memory to the inter-chip interconnect in response to the memory request based at least in part on comparing the second tag bits.

4. The method of claim 3, further comprising:
performing a replacement procedure to move data that satisfies the memory request from a backing memory into the cache memory based at least in part on comparing the second tag bits.

5. The method of claim 3, further comprising:
preloading the identified data from the cache memory into at least one register prior to completion of the comparing the second tag bits.

6. The method of claim 1, further comprising:
comparing the first tag bits to the multiple cache tags of the indexed cache set; and
initiating a data fetch from a backing memory for data that satisfies the memory request based at least in part on comparing the first tag bits.

7. The method of claim 6, further comprising:
completing the data fetch from the backing memory to obtain fetched data; and
transferring the fetched data to the inter-chip interconnect as the data that satisfies the memory request.

8. The method of claim 6, wherein the initiating is performed before the receiving of the MSB portion of the memory address.

9. A method comprising:
formulating, at a memory controller of a host device, a memory request for data based on a memory address, the memory address including a most significant bit (MSB) portion and a least significant bit (LSB) portion;
transmitting a first message for the memory request to a cache memory over multiple wires of an address bus of an inter-chip interconnect, the first message including the LSB portion of the memory address; and
after the transmitting the first message, transmitting a second message for the memory request to the cache memory over the multiple wires of the address bus of the inter-chip interconnect, the second message including the MSB portion of the memory address.

10. The method of claim 9, wherein:
the LSB portion includes set index bits and lower-order tag bits; and
the MSB portion includes higher-order tag bits.

11. The method of claim 9, further comprising:
transmitting another message for another memory request to the cache memory over the inter-chip interconnect between the transmitting the first message and the transmitting the second message.

12. The method of claim 9, wherein:
the first message comprises a row command, and the transmitting the first message comprises transmitting the row command with the LSB portion of the memory address; and
the second message comprises a column command, and the transmitting the second message comprises transmitting the column command with the MSB portion of the memory address.

13. An apparatus comprising:
an interface configured to couple to an inter-chip interconnect for a host device;
a backing memory configured to store data; and
a cache memory coupled to the backing memory and configured to store a subset of the data stored by the backing memory, the cache memory comprising:
an array of memory cells; and
a cache controller coupled to the interface and the array of memory cells, the cache controller configured to:
receive a least significant bit (LSB) portion of a memory address from multiple wires of an address bus of the inter-chip interconnect via the interface;
prior to reception of a most significant bit (MSB) portion of the memory address, start indexing into the array or memory cells using the LSB portion of the memory address; and
receive, after the indexing is started, the MSB portion of the memory address from the multiple wires of the address bus of the inter-chip interconnect via the interface.

14. The apparatus of claim 13, wherein:
the address bus has a first bit-width;
the memory address has a second bit-width; and
the second bit-width is greater than the first bit-width.

15. The apparatus of claim 13, wherein:
the array of memory cells includes multiple cache sets; and
the cache controller is configured to start indexing into the array of memory cells by:

indexing into the multiple cache sets using the LSB portion of the memory address to determine an indexed cache set of the multiple cache sets.

16. The apparatus of claim 15, wherein:
the LSB portion of the memory address comprises set index bits and first tag bits; and
the MSB portion of the memory address comprises second tag bits.

17. The apparatus of claim 16, wherein:
the cache memory comprises multiple cache tags;
the array of memory cells includes multiple cache lines, each respective cache line of the multiple cache lines corresponding to a respective cache tag of the multiple cache tags; and
the cache controller is configured to:
determine the indexed cache set using the set index bits; and
perform, based on the indexed cache set, a partial tag match operation using the first tag bits to determine a predicted match result.

18. The apparatus of claim 17, wherein the cache controller is configured to:
initiate a data fetch from the backing memory before processing the second tag bits of the MSB portion in response to the predicted match result corresponding to an actual miss.

19. The apparatus of claim 17, wherein the cache controller is configured to:
preload at least one register of the cache with data from at least one cache line of the indexed cache set in response to the predicted match result corresponding to a predicted hit.

20. The apparatus of claim 19, wherein the cache controller is configured to:
perform, based on the indexed cache set, a tag match operation using the second tag bits to determine a match result;
responsive to the match result confirming the predicted hit, transfer at least part of the data from the at least one register of the cache to the inter-chip interconnect via the interface; and
responsive to the match result refuting the predicted hit, initiate a data fetch from the backing memory;
complete the data fetch from the backing memory; and
transfer data from the data fetch to the inter-chip interconnect via the interface.

21. The apparatus of claim 13, wherein:
the backing memory comprises a main memory, which includes at least one of dynamic random-access memory (DRAM) or high bandwidth memory (HBM), or both; and
the cache memory comprises static random-access memory (SRAM).

22. The apparatus of claim 13, wherein the inter-chip interconnect is configured to operate in accordance with at least one protocol in which each memory address is propagated over the inter-chip interconnect using two or more messages with each message including at least one different portion of the memory address.

23. The apparatus of claim 22, wherein the at least one protocol comports with at least one double data rate (DDR) memory standard in which data is fetched responsive to both a falling edge and a rising edge of a clock signal.

24. The apparatus of claim 13, further comprising:
a discrete device including the interface, the backing memory, and the cache memory.

25. The apparatus of claim 24, wherein:
the interface is configured to operate in accordance with at least one double data rate (DDR) memory standard;
the backing memory comprises dynamic random-access memory (DRAM); and
the cache memory comprises static random-access memory (SRAM).

* * * * *